(12) United States Patent
Berggren et al.

(10) Patent No.: US 8,749,933 B2
(45) Date of Patent: Jun. 10, 2014

(54) FAULT PROTECTION OF HVDC TRANSMISSION LINES

(75) Inventors: Bertil Berggren, Västerås (SE); Jianping Wang, Västerås (SE); Juiping Pan, Raleigh, NC (US); Kailash Srivastava, Västerås (SE); Kerstin Linden, Ludvika (SE); Reynaldo Nuqui, Cary, NC (US)

(73) Assignee: ABB Research Ltd, Zurich (CH)

( * ) Notice: Subject to any disclaimer, the term of this patent is extended or adjusted under 35 U.S.C. 154(b) by 14 days.

(21) Appl. No.: 13/703,930

(22) PCT Filed: Sep. 13, 2010

(86) PCT No.: PCT/EP2010/063372
§ 371 (c)(1),
(2), (4) Date: Dec. 13, 2012

(87) PCT Pub. No.: WO2011/157305
PCT Pub. Date: Dec. 22, 2011

(65) Prior Publication Data
US 2013/0088802 A1 Apr. 11, 2013

Related U.S. Application Data

(60) Provisional application No. 61/354,527, filed on Jun. 14, 2010.

(51) Int. Cl.
*H02H 3/00* (2006.01)
*H02H 7/00* (2006.01)

(52) U.S. Cl.
USPC ............................................. 361/65; 361/79

(58) Field of Classification Search
CPC ........... H02H 3/38; H02H 3/42; H02H 3/422; H02H 3/445
USPC ...................... 361/65, 79, 82, 93.1
See application file for complete search history.

(56) References Cited

U.S. PATENT DOCUMENTS

3,421,052 A   1/1969   Hammarlund
4,100,587 A * 7/1978   Anderson et al. ............... 361/82
(Continued)

FOREIGN PATENT DOCUMENTS

GB   1 297 628    11/1972
JP   59-50730 A   3/1984
(Continued)

OTHER PUBLICATIONS

Naidoo et al., "HVDC Line Protection for the Proposed Future HVDC Systems", Power System Technology—PowerCon 2004, 2004 International Conference on Singapore, Nov. 21-24, 2004, vol. 2, pp. 1327-1332, XP10811476.

(Continued)

*Primary Examiner* — Rexford Barnie
*Assistant Examiner* — Christopher Clark
(74) *Attorney, Agent, or Firm* — Birch, Stewart, Kolasch & Birch, LLP (57) ABSTRACT

A protection system for high voltage direct current, HVDC, transmission lines is provided. The protection system includes a direct current, DC, bus, a device configured to connect an HVDC transmission line to the bus, at least one DC circuit breaker arranged for disconnecting the transmission line from the bus upon reception of a trip signal, current and voltage sensors, an inductor arranged such that the current through the transmission line passes the inductor, and a fault detection unit. The fault detection unit is arranged for assessing, on the basis of current and/or voltage measurements, whether a fault exists on the transmission line, and sending, if a fault is detected on the transmission line, a trip signal to the circuit breaker. The additional inductance limits the rise in fault current and facilitates a selective fault detection. Further, a method of fault protection for an HVDC transmission line is provided.

20 Claims, 6 Drawing Sheets

(56) References Cited

U.S. PATENT DOCUMENTS

| | | |
|---|---|---|
| 6,822,457 B2 | 11/2004 | Borchert et al. |
| 6,987,389 B1* | 1/2006 | Macbeth et al. ............ 324/536 |
| 7,983,877 B2* | 7/2011 | Koehl ........................ 702/185 |
| 8,179,147 B2* | 5/2012 | Dargatz et al. .............. 324/536 |
| 2007/0133135 A1 | 6/2007 | Kilroy et al. |
| 2009/0085574 A1 | 4/2009 | Pan et al. |
| 2009/0104044 A1* | 4/2009 | Koehl ........................... 417/53 |
| 2012/0206843 A1* | 8/2012 | Dargatz et al. ............... 361/18 |
| 2013/0077204 A1* | 3/2013 | Berggren et al. ............ 361/102 |

FOREIGN PATENT DOCUMENTS

| | | |
|---|---|---|
| JP | 61-164423 A | 7/1986 |
| WO | WO 99/63641 A1 | 12/1999 |

OTHER PUBLICATIONS

Tang et al., "Locating and Isolating DC Faults in Multi-Terminal DC Systems", IEEE Transactions on Power Delivery, Jul. 1, 2007, vol. 22, No. 3, pp. 1877-1884.

\* cited by examiner

FAULT PROTECTION OF HVDC TRANSMISSION LINES

CROSS REFERENCE TO RELATED APPLICATIONS

This application is the National Phase of PCT/EP2010/063372 filed on Sep. 13, 2010, which claims priority under 35 U.S.C. 119(e) to U.S. Provisional Application No. 61/354,527 filed on Jun. 14, 2010, all of which are hereby expressly incorporated by reference into the present application.

FIELD OF THE INVENTION

The invention relates in general to high voltage direct current (HVDC) power transmission, and more specifically to fault protection of HVDC transmission lines comprised in an HVDC grid.

BACKGROUND OF THE INVENTION

HVDC power transmission is becoming increasingly important due to the steadily rising need for bulk power delivery and power grid interconnections. In particular, using HVDC transmission based on voltage source converters (VSC), power can be transmitted with cables and overhead lines which are embedded or overlapped with high voltage alternating current (AC) transmission networks. An attractive feature of HVDC transmission is that the direction of power transmission can be changed by changing the direction of current.

An HVDC grid comprises multiple VSCs, also referred to as terminals, which convert an AC power source for transmission over an HVDC transmission line, i.e., cables or overhead lines, as well as the combination of cables and overhead lines. Different configurations of HVDC transmission lines are known, such as monopole, symmetric monopole, and bipolar. For instance, a bipolar HVDC transmission line comprises a positive pole line, a negative pole line, and a metallic return line connected to ground. Within the grid, each terminal may be connected to multiple terminals by HVDC transmission lines resulting in different types of topologies. Such a multiple terminal grid enables efficient congestion management and has an improved stability against disturbances.

The known technique for isolating line faults in point-to-point HVDC links is to detect the fault, block the converter stations, and open AC circuit breakers to interrupt the current. In HVDC grids, however, more advanced fault protection techniques are required.

SUMMARY OF THE INVENTION

It is an object of the present invention to provide a more efficient alternative to the above techniques and prior art.

More specifically, it is an object of the present invention to provide an improved fault protection in high voltage direct current (HVDC) grids.

These and other objects of the present invention are achieved by means of an HVDC fault protection system having the features defined in independent claim 1, and by means of a method of fault protection for an HVDC unit defined in independent claim 13. Embodiments of the invention are characterized by the dependent claims.

For the purpose of describing the present invention, the discussion is limited to the positive pole line of a bipolar HVDC transmission line. Embodiments covering the entire bipolar transmission line, i.e., including both the positive and the negative pole line, as well as other transmission line configurations, may easily be envisaged.

Possible faults that may occur on a bipolar HVDC transmission line are, e.g., positive pole to negative pole short circuits, positive pole to ground short circuits, and negative pole to ground short circuits.

According to a first aspect of the invention, an HVDC fault protection system is provided. The fault protection system comprises an HVDC unit and a protection unit. The HVDC unit comprises a direct current (DC) bus, means for connecting at least one HVDC transmission line to the bus, and at least one DC circuit breaker. The circuit breaker is arranged for disconnecting the transmission line from the bus upon reception of a trip signal. The protection unit comprises a current sensor, a voltage sensor, an inductor, and a fault detection unit. The current sensor is arranged for measuring a current 40 through the transmission line. The voltage sensor is arranged for measuring a voltage U(t) between the transmission line and ground. The inductor or inductors are arranged such that the current through the transmission line passes the inductor. The fault detection unit is arranged for assessing whether a fault exists on the transmission line and sending a trip signal to the circuit breaker if a fault is detected on the transmission line. The assessment, whether a fault exists on the transmission line, is effected by deriving at least one fault measure from the voltage, the current, or the voltage and the current, and comparing the fault measure with a predetermined value.

According to a second aspect of the invention, a method of fault protection for an HVDC unit is provided. The HVDC unit comprises a DC bus, means for connecting at least one HVDC transmission line to the bus, and at least one DC circuit breaker. The circuit breaker is arranged for disconnecting the transmission line from the bus upon reception of a trip signal. An inductor or inductors are arranged such that a current through the transmission line passes the inductor or inductors. The method comprises the steps of measuring the current I(t) through the transmission line, measuring a voltage U(t) between the transmission line and ground, assessing whether a fault exists on the transmission line, and sending a trip signal to the circuit breaker if a fault is detected on the transmission line. The step of assessing whether a fault exists on the transmission line is effected by deriving at least one fault measure from the voltage, the current, or the voltage and the current, and comparing the fault measure with a predetermined value.

The present invention makes use of an understanding that an improved fault protection of HVDC transmission lines can be obtained by arranging an inductor, also known as station reactor, such that the current through the transmission line flows through the inductor, and by using current and/or voltage measurements in assessing whether a fault exists on the transmission line. This is advantageous since it provides a quick way of detecting a fault, and subsequently isolating the fault using DC circuit breakers, by way of current and voltage measurements. The use of DC circuit breakers instead of AC circuit breakers enables the isolation of an individual faulty transmission line in an HVDC grid, as opposed to shutting down an entire converter station. The fault detection is quick enough, of the order of a few milliseconds, such that the fault may be isolated before the fault current exceeds the interrupting limits of the DC circuit breakers. Arranging an inductor or inductors such that the current through the transmission line passes the inductor or inductors is advantageous since the additional inductance limits the rise in fault current.

According to an embodiment of the invention, the inductor is connected in series with the transmission line and at the end of the transmission line. Arranging the inductor such that it is connected in series with the transmission line is advantageous since it limits the rise in fault current flowing through the transmission line.

According to another embodiment of the invention, the inductor or inductors are connected in series with the DC circuit breakers in the DC bus. Arranging the inductor such that it is connected in series with the DC circuit breakers in the DC bus is advantageous since it limits the rise in fault current flowing through the DC circuit breakers in the DC bus.

According to an embodiment of the invention, the fault detection unit is further arranged for assessing whether a fault exists on the transmission line by evaluating $S=[U(t_2)-U(t_1)]\times[I(t_2)-I(t_1)]$ and deciding that a fault exists on the transmission line if $S<-S_0$. $t_1$ and $t_2$ are consecutive sampling times and $S_0$ is a predetermined positive value. Detecting a fault on an HVDC transmission line using the technique outlined above, and which is referred to as transient based fault protection (TBFP), amounts to capturing the travelling wave which is caused by the fault induced transient and which is travelling in both directions on the transmission line. In order to capture the travelling wave, the current and voltage should be sampled sufficiently fast.

According to another embodiment of the invention, the fault detection unit is further arranged for assessing whether a fault exists on the transmission line by deciding that a fault exists on the transmission line if $I(t)>I_0$ and if $U(t)<U_0$ during a predetermined time interval $\Delta t$. $I_0$ and $U_0$ are predetermined positive values. This voltage restrained directional overcurrent protection (VRDOP) technique is based on the increasing current and the voltage drop seen by the current and voltage sensors shortly after a short circuit fault.

According to a further embodiment of the invention, the fault detection unit is further arranged for assessing whether a fault exists on the transmission line by defining at least two different protection zones for the transmission line, and deciding that a fault exists in zone n on the transmission line if $I(t)>I_0''$ and if $U(t)<U_0''$ during a time interval $\Delta t''$. The decision is taken for each zone n separately. $I_0''$, $U_0''$, and $\Delta t''$, are predetermined positive values associated with zone n. Subdividing a transmission line into distinct zone is advantageous since it allows for a selective fault detection. In that way, different settings may be used for the various zones. Using different observation periods $\Delta t''$ one may, e.g., realize a fast fault detection for some parts of the transmission line while providing a slow detection, suitable for backup purposes, for other parts of the transmission line. Protection zones are not limited to transmission lines but may also cover other parts and components of an HVDC grid, such as DC circuit breakers or DC buses. Inductors having different inductance values are arranged at different locations of the grid. Preferably at the end of the transmission line, or in conjunction with the switchyard.

According to an embodiment of the invention, the fault detection unit is further arranged for assessing whether a fault exists on the transmission line by evaluating $$\frac{dI(t)}{dt} \text{ and } \frac{dU(t)}{dt},$$

and deciding that a fault exists on the transmission line if $$\frac{dI(t)}{dt} > I_0' \text{ and } \frac{dU(t)}{dt} < -U_0' \cdot I_0' \text{ and } U_0'$$

are predetermined positive values. The protection scheme described above, referred to as voltage derivative supervised current derivative protection (VDSCDP), utilizes the transient response which the HVDC transmission system undergoes during the fault. Since current is fed into the faulty transmission line, the current derivative is positive, while the voltage derivative is negative due to the voltage drop accompanying the fault. The transient response of the current immediately following the fault is largely determined by the inductance of the transmission line, in particular that of the inductor.

According to another embodiment of the invention, the fault detection unit is further arranged for assessing whether a fault exists on the transmission line by evaluating $$\frac{dI_{ext}(t)}{dt}$$

and deciding that a fault exists on the transmission line if $$\frac{dI_{ext}(t)}{dt} < I_{ext,0}' \cdot I_{ext}(t)$$

is the measured current through another transmission line connected to the bus. $I'_{ext,0}$ is a predetermined positive value. In case of a fault on a transmission line connected to other transmission lines, e.g., by way of a bus, the current through the healthy transmission lines would feed into the faulty transmission line, leading to a negative rate of change of the current through the healthy cables. Utilizing current measurements from other transmission lines in addition to measurements from the transmission line is advantageous since it makes the fault assessment more reliable by avoiding false positives.

According to a further embodiment of the invention, the fault detection unit is further arranged for assessing whether a fault exists on the transmission line by deciding that a fault exists on the transmission line if $I(t)>I_0$ and $U(t)<U_0$. $I_0$ and $U_0$ are predetermined positive value. Using the measured current and voltage values as an additional measure is advantageous since it renders the assessment of a fault on a transmission line more reliable. In the embodiment described above, the rising current and the drop in voltage shortly after the occurrence of a fault are utilized.

According to an embodiment of the invention, the fault protection system is comprised in an HVDC switchyard. This is advantageous since it allows to detect and isolate faults on transmission lines connected to the switchyard.

According to another embodiment of the invention, the fault protection system is comprised in an HVDC converter station. This is advantageous since it allows to detect and isolate faults on transmission lines connected to the converter station.

According to another embodiment of the invention, the fault protection system is comprised in an HVDC grid. This is advantageous since it allows to detect and isolate faults on transmission lines comprised in the grid.

Even though embodiments of the present invention, and advantages thereof, have in some cases been described with reference to the fault protection system according to the first aspect of the invention, corresponding reasoning applies to the method according to the second aspect of the invention.

It will also be appreciated that the present invention is not limited to fault protection of HVDC transmission lines. On the contrary, embodiments of the invention for fault protection of other parts or components comprised in HVDC grids, such as DC circuit breakers or DC buses, may be envisaged.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

Figure 1:
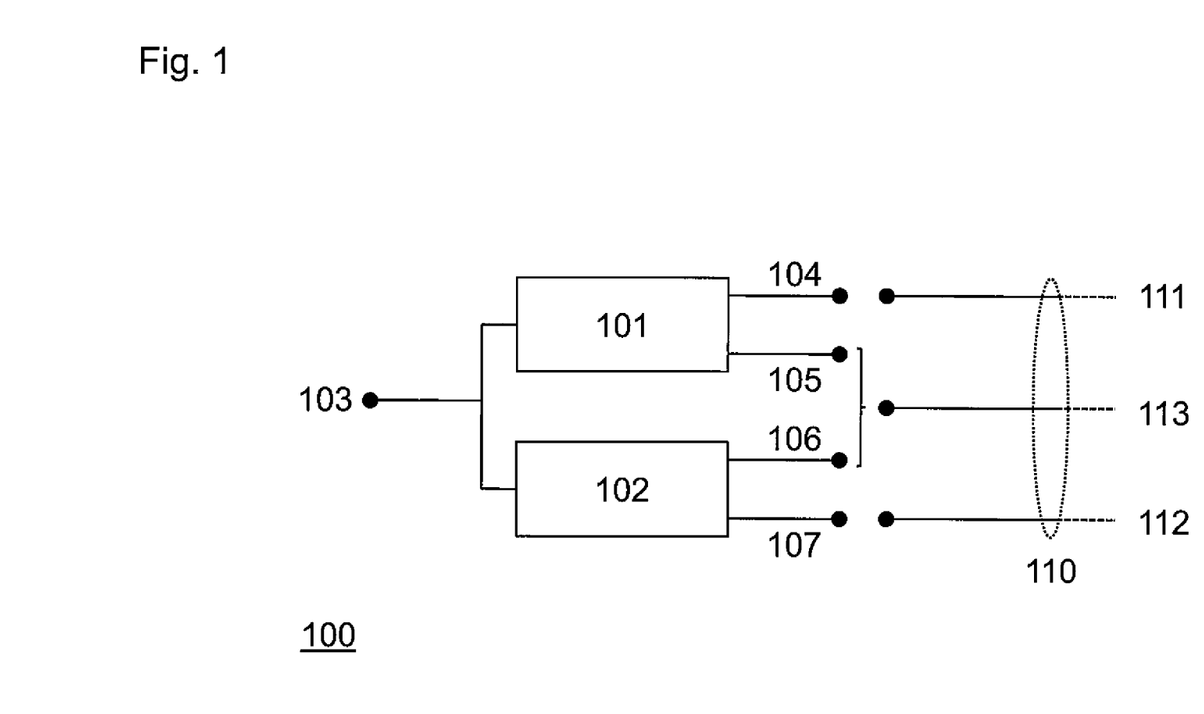
FIG. 1 shows the structure of a bipolar HVDC converter station.

For the purpose of describing the invention, the structure of a bipolar HVDC converter station 100 is described with reference to FIG. 1. Converter station 100 comprises a positive pole converter 101 and a negative pole converter 102. Converters 101 and 102 are connected to an AC source 103. The negative output 105 of the positive pole converter 101, and the positive output 106 of the negative pole converter 102, respectively, are connected to a common ground.

An HVDC transmission line 110, comprising a positive pole line 111, a negative pole line 112, and a common return line 113, may be connected to the positive output 104 of positive pole converter 101, the negative output 107 of negative pole converter 102, and the common ground, respectively. Typically, a transmission line is not connected directly to a converter but to a DC bus interconnecting several transmission lines and converter stations in a switchyard.

For the remainder, the discussion is limited to the positive pole of a bipolar HVDC transmission line only. Thus, any reference to the transmission line is to be understood to mean the positive pole line of a bipolar transmission line, unless specified otherwise. Corresponding reasoning applies to the negative pole line, and embodiments of the invention for the negative pole line, both pole lines, of a bipolar transmission line as well as other transmission line configurations may easily be envisaged by the person skilled in the art.

An embodiment of the HVDC fault protection system according to the first aspect of the invention is described with reference to FIG. 2.

The fault protection system 200 comprises a DC bus 201, means for connecting a transmission line 202 to bus 201, and DC circuit breakers 203 and 204. Circuit breakers 203 and 204 are arranged for interrupting the flow of current through the transmission line 202.

System 200 further comprises a protection unit 210 comprising a current sensor 211, a voltage sensor 212, an inductor 213 connected in series with the transmission line 202, and a fault detection unit 220. Current sensor 211 and voltage sensor 212 are arranged for measuring the current through the transmission line 202 and the voltage between the transmission line 202 and ground. The fault detection unit 220 is arranged for assessing whether a fault exists on the transmission line 202. The assessment is effected by retrieving current and voltage measurements from 211 and 212, and by comparing the current values, the voltage values, both current and voltage values, or measures derived thereof, to predetermined values in a way elucidated below. If fault detection unit 220 detects a fault on the transmission line 202, a trip signal is sent to one or several of the circuit breakers 203 and 204.

Figure 2:
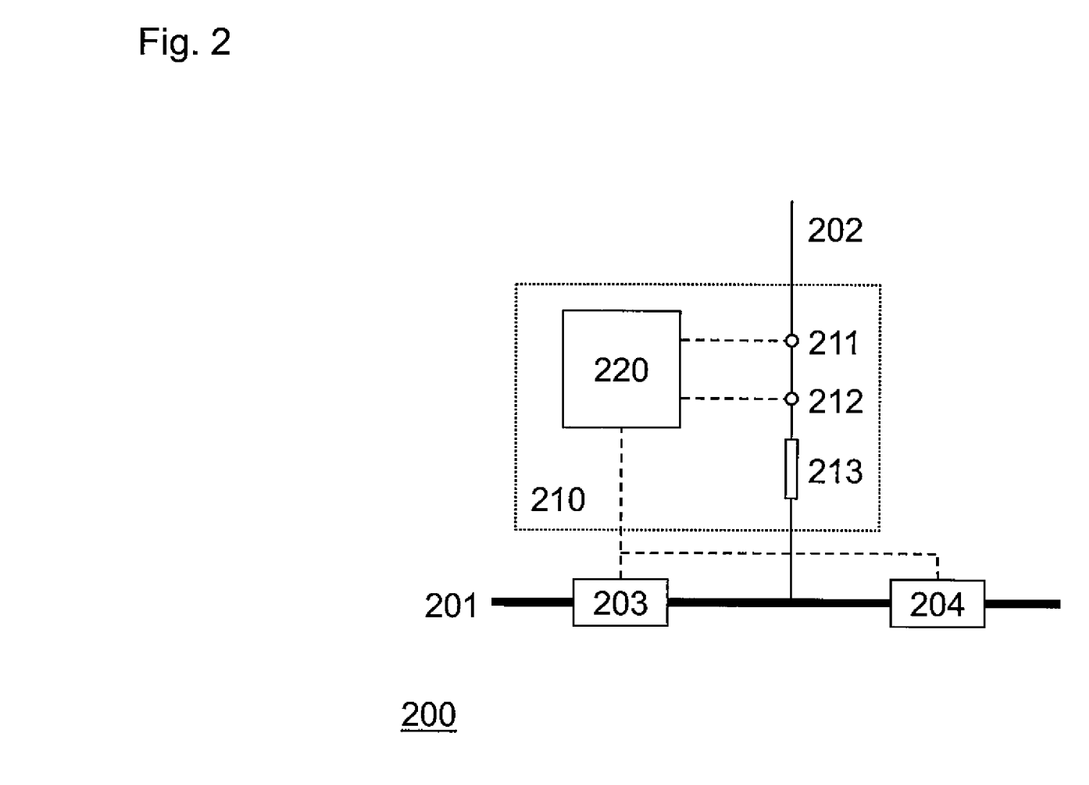
FIG. 2 shows an HVDC fault protection system, in accordance with an embodiment of the invention.
Figure 3:
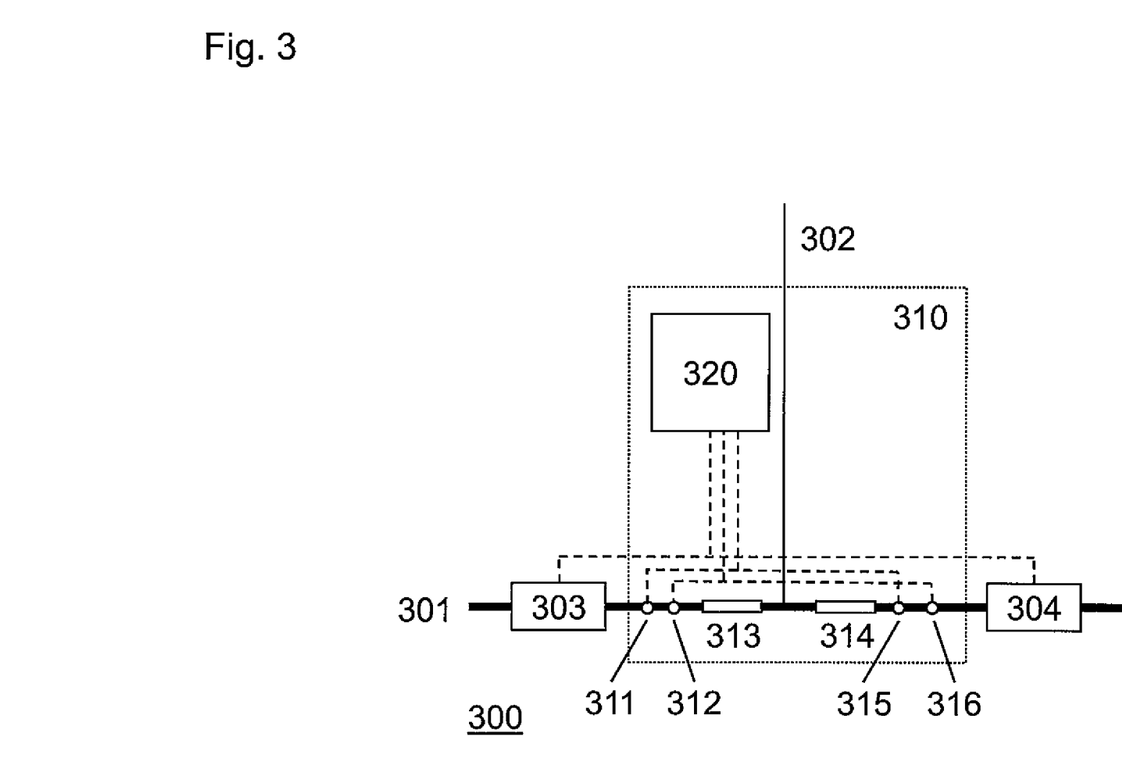
FIG. 3 shows an HVDC fault protection system, in accordance with another embodiment of the invention.

Even though, with reference to FIG. 2, inductor 213 is connected in series with transmission line 202, the inductor may be arranged with other components of the fault protection system. Further, the current sensor 211 and voltage sensors 212 may be arranged with other components of the fault protection system. As an example, another embodiment of a fault protection system is illustrated in FIG. 3.

Fault protection system 300 comprises a DC bus 301, means for connecting a transmission line 302 to bus 301, and DC circuit breakers 303 and 304. Circuit breakers 303 and 304 are arranged for interrupting the flow of current through the transmission line 302.

System 300 further comprises a protection unit 310 comprising current sensors 311 and 315, voltage sensors 312 and 316, inductors 313 and 314 connected in series with the DC bus, and a fault detection unit 320. Current sensors 311 and 315, and voltage sensors 312 and 316, are arranged for measuring the current through the DC bus 301 and the voltage between the DC bus 301 and ground. The fault detection unit 320 is arranged for assessing whether a fault exists on the transmission line 302. The assessment is effected by retrieving current and voltage measurements from 311, 312, 315, and 316, and by comparing the current values, the voltage values, both current and voltage values, or measures derived thereof, to predetermined values in a way elucidated below. If fault detection unit 320 detects a fault on the transmission line 302, a trip signal is sent to one or several of the circuit breakers 303 and 304.

Figure 4:
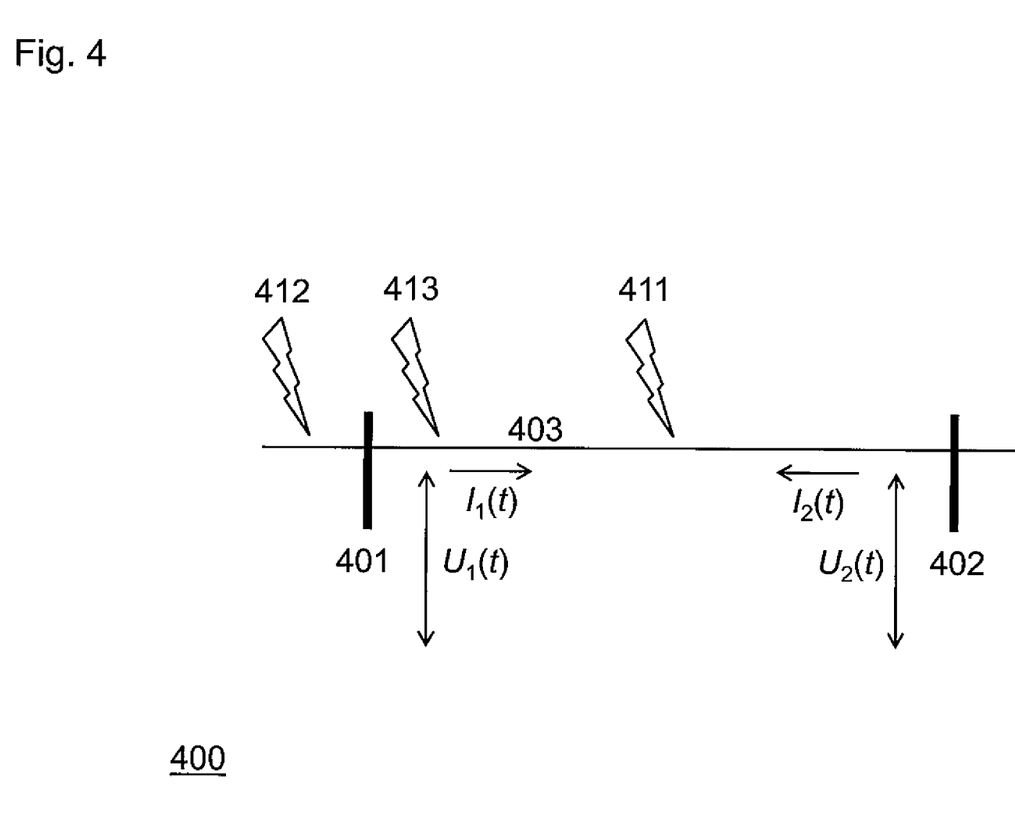
FIG. 4 illustrates a section of a multi terminal HVDC grid.

The fault protection systems 200 and 300 may be part of an HVDC switchyard, which typically comprises further means for connecting transmission lines, and/or voltage source converters, as well as further DC circuit breakers for controlling the flow of current through the switchyard. Thus, protection units 210 and 310, in particular fault detection units 220 and 320, may be designed to protect a specific transmission line. It may also be configured to interact with other fault protection systems of the grid. For instance, the fault detection unit may interact with neighboring protection systems in order to coordinate the tripping of circuit breakers, or to retrieve current and voltage measurements performed on adjacent transmission lines. The assessment, whether a fault occurred on an HVDC transmission line monitored by fault protection systems 200 and 300, may be performed according to a number of different algorithms. In the following, the different algorithms are described. With reference to FIG. 4, which illustrates a section of a multi terminal HVDC grid 400, an embodiment of the invention referred to as transient based fault protection (TBFP) is described. TBFP is based on the idea of capturing the travelling wave which is induced by a fault on the transmission line. In FIG. 4, transmission line 403 interconnects buses 401 and 402. The current through the transmission line, and the voltage between the transmission line and ground, are measured at both ends. Thus, $I_1(t)$ and $U_1(t)$ are the current and voltage measured close to bus 401, and $I_2(t)$ and $U_2(t)$ are the current and voltage measured close to bus 402. The arrows define the direction of current. Also shown in FIG. 4 are three possible faults 411-413 at different locations along the transmission line 403. Faults 411 and 413 occur in forward direction relative to both buses 401 and 402, i.e., in the direction of the flow of currents $I_1(t)$ and $I_2(t)$, respectively, whereas fault 412 occurs in backward direction relative to bus 401, i.e., opposite to the flow of current $I_1(t)$, but in forward direction relative to bus 402. Fault 413 is located close to bus 401, whereas fault 411 occurs approximately at equal distance from bus 401 and bus 402.

The fault induced traveling waves may be captured by sampling the current and voltage at two consecutive sampling times $t_1$ and $t_2$, where $\Delta t = t_2 - t_1$ is sufficiently small. Preferably, $\Delta t$ should be of the order of 1 ms or smaller.

For the assessment, whether a fault exists on the transmission line, the fault detection unit evaluates $\Delta I_1 = I_1(t_2) - I_1(t_1)$ and $\Delta U_1 = U_1(t_2) - U_1(t_1)$, and, correspondingly, $\Delta I_2$ and $\Delta U_2$. Subsequently, measures $S_1$ and $S_2$ are calculated as $S_1 = \Delta I_1 \times \Delta U_1$ and $S_2 = \Delta I_2 \times \Delta U_2$, respectively, and compared to a positive threshold value $S_0$.

For faults on the transmission line, such as fault 411 shown in FIG. 4, both $S_1$ and $S_2$ will be negative and below a certain value $S_0$ during a short period of time $\Delta t$. If, on the other hand, the fault is in backward direction relative to bus 401, such as fault 412 in FIG. 4, $S_1$ will have a positive value. $S_2$ however, still has a negative value since the fault is in forward direction relative to bus 402. By setting a suitable threshold value $S_0$, a false detection of a fault in forward direction relative to bus 402, but backward direction relative to bus 401, may be avoided.

The algorithm described above may further be improved by comparing the measured voltages $U_1(t)$ and $U_2(t)$ to a positive threshold value $U_0$. A trip signal is only enabled if the measured voltage is smaller than the threshold value, e.g., due to a short circuit induced voltage drop. In that way false positives, i.e., false alarms, may be avoided.

With reference to FIG. 4, a further embodiment of the present invention is described. The protection algorithm referred to as voltage restrained direction overcurrent protection (VRDOP) utilizes two characteristics seen in connection with short circuit faults on transmission lines, namely a fast increasing current and a sudden voltage drop. In the assessment, whether a fault has occurred on the transmission line, a directional overcurrent together with a voltage drop, both of which are sustained during a certain time period, are used as an indication for a fault.

Further, by configuring an HVDC grid with inductors at different locations of the grid, preferably at the end of the transmission line, or in conjunction with the switchyard, a selective fault detection, and a subsequent selective fault isolation, becomes feasible. The effect of the additional inductances is to limit the fault current and to provide a clear difference in the magnitude between both fault current and voltage drop measurements for faults at different locations in the grid. In other words, it is the existence of discrete inductances at distinct locations of the grid, as opposed to the rather continuous distribution of the inductance inherent to cables, which enables a selective fault detection.

Figure 5:
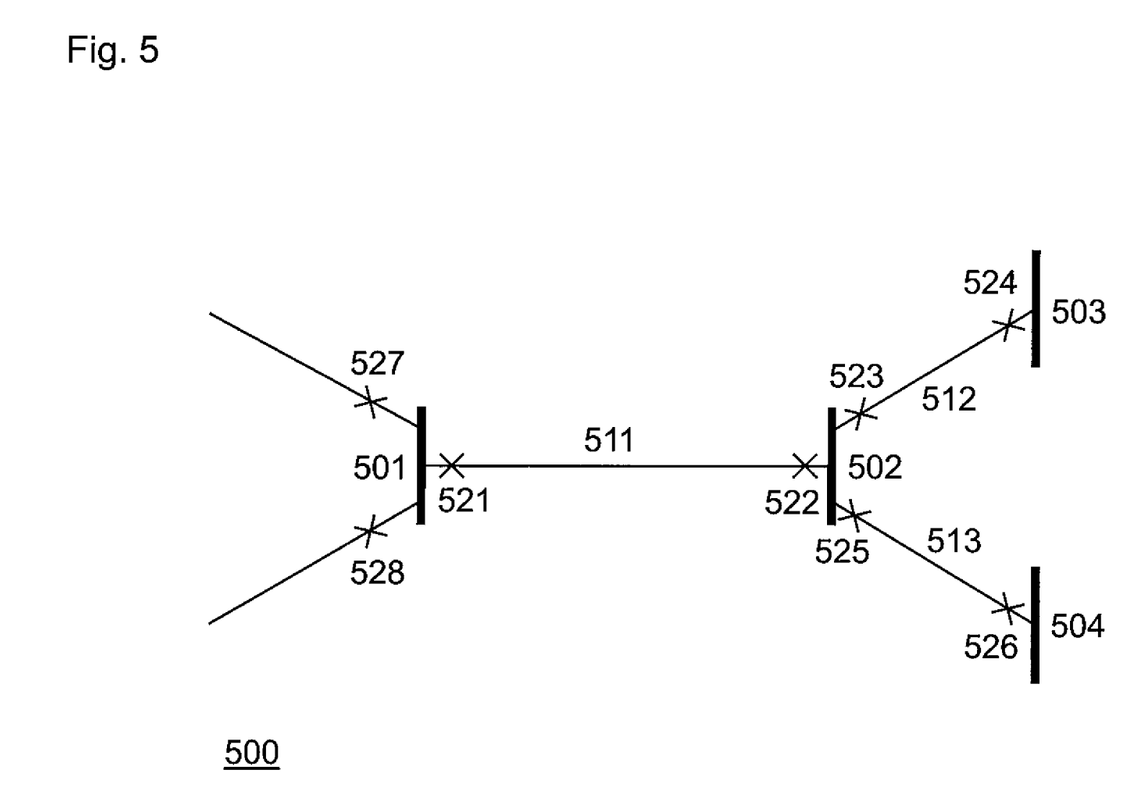
FIG. 5 illustrates another section of a multi terminal HVDC grid.

A section of an HVDC grid with inductors located at different locations of the grid is illustrated in FIG. 5. The grid section 500 comprises DC buses 501-504 interconnected by transmission lines 511-513. Each transmission lines is configured with inductors 521-528 located at the end of each line. Since the rates of change of current and voltage in response to the fault are dictated by inductors 521-528, the location of the fault, i.e., whether it occurred on transmission line 511, 512, or 513, may be derived from the measured current and voltage. Preferably, the inductors 521-528 have distinct inductance values.

The selective fault detection may be used to provide individual protection for separate zones of the transmission line, which zones are defined by inductors connected in series with the transmission lines. This is achieved by assigning separate sets of threshold values for current $I_0''$ and voltage $U_0''$, in addition to a time period $\Delta t''$, to each zone n. One may, e.g., provide a fast detection scheme for a zone close to the converter stations in addition to a zone protecting the entire transmission line. Further, one may provide backup protection for a remote transmission line by using a proper set of threshold values.

In the assessment of whether a fault has occurred it is checked, for each zone separately, whether the current is greater than the current threshold $I_0''$ for the zone and whether the voltage is smaller than the voltage threshold $U_0''$ for the zone. If both conditions are fulfilled during the entire time period $\Delta t''$ set for the zone, it is concluded that a fault has occurred.

Even though the principle of VRDOP multi zone protection has been exemplified by a scheme with three distinct protection zones, embodiments of the invention providing protection for any number of zones may be envisaged as long as the measured values for overcurrent and voltage drop are clearly distinguishable for faults occurring in the distinct zones.

A third protection algorithm, referred to as voltage derivative supervised current derivative protection (VDSCDP), is described with reference to FIG. 6, which illustrates another section of a multi terminal HVDC grid 600.

Figure 6:
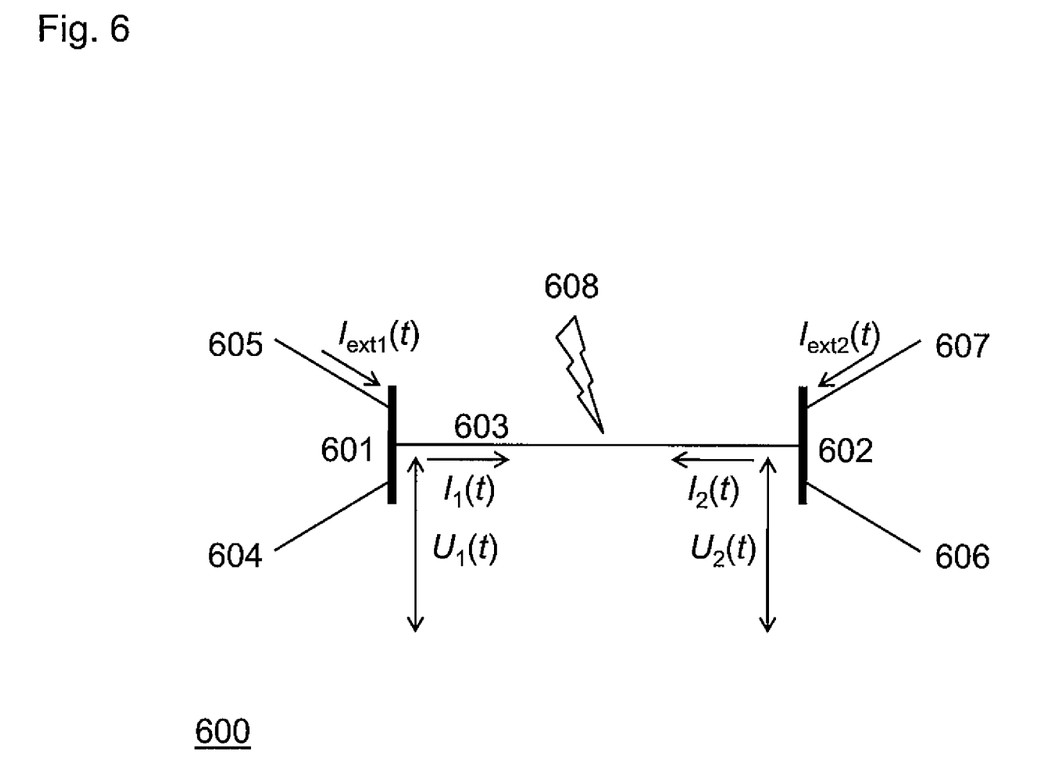
FIG. 6 illustrates yet another section of a multi terminal HVDC grid.

In FIG. 6, an HVDC transmission line 603 connecting two terminals 601 and 602 is shown. Each terminal comprises a DC bus connecting further transmission lines 604-607. If a short circuit fault occurs on the transmission line 603, such as fault 608 illustrated in FIG. 6, the system undergoes a transient response that is captured as dynamic changes in the measured currents and voltages.

$I_1(t)$ and $I_2(t)$ are the currents through transmission line 603 from terminals 601 and 602, respectively, whereas $I_{ext1}(t)$ and $I_{ext2}(t)$ are the currents through transmission lines 605 and 607. Transmission lines 604-607 are referred to as being external in relation to the transmission line, since they are outside the zone of protection. The direction of flow is towards the faulty transmission line 603 for all currents, as is indicated by the arrows.

The transient response of the current immediately following the fault is largely dictated by the inductances in the cables and the station reactors, e.g., inductor 213. The derivative of this transient response is positive for the currents fed into transmission line 603 from terminals 601 and 602 adjacent to the fault, thus $$\frac{dI_1(t)}{dt} > I'_{1,0} \text{ and } \frac{dI_2(t)}{dt} > I'_{2,0},$$

regardless of the direction of current before the fault. I'$_{1,0}$ and I'$_{2,0}$ are positive threshold values chosen to prevent false positives by taking into account changes in current during normal operation, e.g., due to load changes. The current from terminals 601 and 602 into the healthy transmission lines 604-607 on the other hand will decrease, since current is fed into the fault 608 on transmission line 603. Thus, regardless of the direction of current before the fault, $$\frac{dI_{ext1}(t)}{dt} < -I'_{ext1,0} \text{ and } \frac{dI_{ext2}(t)}{dt} < -I'_{ext2,0},$$

where I'$_{ext1,0}$ and I'$_{ext1,0}$ are positive threshold values.

In other words, a positive current derivative indicates an internal fault, i.e., the fault is located within the protected section, whereas a negative current derivative indicates an external fault, i.e., a fault that is located outside the protected section.

During a fault the voltage tends to decrease in absolute value. Correspondingly, the rates of change of voltages $U_1(t)$ and $U_2(t)$, measured at terminals 601 and 602, respectively, may be used as an additional measure in assessing whether a fault has occurred. Negative voltage derivatives, i.e., $$\frac{dU_1(t)}{dt} < -U'_{1,0} \text{ and } \frac{dU_2(t)}{dt} < -U'_{2,0},$$

where U'$_{1,0}$ and U'$_{2,0}$ are positive threshold values, are used as an additional indication for a fault.

As a further measure for assessing whether a fault has occurred, one may compare the measured voltages to positive threshold values $U_{1,0}$ and $U_{2,0}$, i.e., one evaluates whether $U_1(t) < U_{1,0}$ and $U_2(t) < U_{2,0}$, respectively. In addition to that, one may compare whether the measured currents $I_1(t)$ and $I_2(t)$ exceed their positive threshold values $I_{1,0}$ and $I_{2,0}$, respectively.

Depending on the HVDC grid for which a protection system is to be designed, and the requirements that have to be met, one may combine the different conditions outlined above, i.e., the conditions for the measured currents, voltages, or their derivatives, in different ways.

The purpose of the threshold values used throughout the protection algorithms described above is to adjust the sensitivity of the protection system to the application at hand, while at the same time minimizing the risk for false positives. In other words, threshold values are chosen such that current and voltage changes during normal operation, which may, e.g., arise due to load changes, are not recognized as being characteristic of a fault on the transmission line.

Even though embodiments of the invention have in some cases been described with reference to the fault protection system according to the first aspect of the invention, corresponding reasoning applies to embodiments of the method according to the second aspect of the invention.

Embodiments of the fault protection system according to the first aspect of the invention may be implemented by circuitry comprising electronic components, integrated circuits (IC), application specific integrated circuits (ASIC), field programmable gate arrays (FPGA), complex programmable logic devices (CPLD), or any combination thereof. Any circuitry may, at least in part, be replaced by processing means, e.g., a processor executing an appropriate software. It will also be appreciated that an embodiment of the method according to the second aspect of the invention may be implemented on a computing device capable of retrieving current and voltage measurements from sensors arranged for measuring the current through the transmission line and the voltage between the transmission line and ground.

The person skilled in the art realizes that the present invention by no means is limited to the embodiments described above. On the contrary, many modifications and variations are possible within the scope of the appended claims. For example, a protection system may also comprise an auto-recloser for clearing the trip signal if the fault was temporary. Further, one may design embodiments of the invention by combining the different protection algorithms explained above in any way suitable for the application at hand. For instance, one may implement local and remote protection as well as backup protection functions. A protection system may also comprise means for logging faults and/or current and voltage measurements as well as means for interfacing with a human operator or other existing protection and surveillance systems. Finally, it will be appreciated that an embodiment of the invention may protect the positive and negative pole lines of a bipolar transmission line individually. Thus, if a fault occurs only on one of the pole lines, the other line may still be used for power transmission.

In conclusion, a protection system for HVDC transmission lines is provided. The protection system comprises a DC bus, means for connecting an HVDC transmission line to the bus, at least one DC circuit breaker arranged for disconnecting the transmission line from the bus upon reception of a trip signal, current and voltage sensors, an inductor or inductors are arranged such that the current through the transmission line passes the inductor or inductors, and a fault detection unit. The fault detection unit is arranged for assessing, on the basis of current and/or voltage measurements, whether a fault exists on the transmission line, and sending, if a fault is detected on the transmission line, a trip signal to the circuit breaker. The additional inductance limits the rise in fault current and facilitates a selective fault detection. Further, a method of fault protection for an HVDC transmission line is provided.

The invention claimed is:

1. A high voltage direct current, HVDC, fault protection system comprising:
   an HVDC unit comprising:
      a direct current, DC, bus,
      means for connecting at least one HVDC transmission line to the bus, and
      at least one DC circuit breaker being arranged for disconnecting the transmission line from the bus upon reception of a trip signal, and
   a protection unit comprising:
      a current sensor being arranged for measuring a current I(t) through the transmission line,
      a voltage sensor being arranged for measuring a voltage U(t) between the transmission line and ground,
      an inductor or inductors being arranged such that the current through the transmission line passes the inductor or inductors, and
      a fault detection unit arranged for:
         assessing whether a fault exists on the transmission line by deriving at least one fault measure from the voltage and/or current and comparing the fault measure with a predetermined value, and
         sending, if a fault is detected on the transmission line, a trip signal to the circuit breaker, and wherein
         the fault detection unit is further arranged for assessing whether a fault exists on the transmission line by:

evaluating $S=[U(t_2)-U(t_1)]\times[I(t_2)-I(t_1)]$, where $t_1$ and $t_2$ are consecutive sampling times, and deciding that a fault exists on the transmission line if $S<-S_0$, where $S_0$ is a predetermined positive value.

2. The system according to claim 1, wherein the inductor is connected in series with the transmission line.

3. The system according to claim 1, wherein the inductor is connected in series with the DC bus.

4. The system according to claim 1, wherein the fault detection unit is further arranged for:

comparing the measured voltages $U(t_1)$ and $U(t_2)$ to a positive threshold value $U_0$, and enabling the trip signal to be sent, only if the measured voltages are smaller than the threshold value $U_0$.

5. A high voltage direct current, HVDC, switchyard comprising a fault protection system according to claim 1.

6. A high voltage direct current, HVDC, converter station comprising a fault protection system according to claim 1.

7. A high voltage direct current, HVDC, grid comprising a fault protection system according to claim 1.

8. A method of fault protection for a high voltage direct current, HVDC, unit comprising:

a direct current, DC, bus, means for connecting at least one HVDC transmission line to the bus, and at least one DC circuit breaker being arranged for disconnecting the transmission line from the bus upon reception of a trip signal, wherein an inductor or inductors are arranged such that a current through the transmission line passes the inductor or inductors, the method comprising:

measuring the current $I(t)$ through the transmission line, measuring a voltage $U(t)$ between the transmission line and ground, assessing whether a fault exists on the transmission line by deriving at least one fault measure from the voltage and/or current and comparing the fault measure with a predetermined value, wherein said assessment whether a fault exists comprises evaluating $S=[U(t_2)-U(t_1)]\times[I(t_2)-I(t_1)]$, where $t_1$ and $t_2$ are consecutive sampling times, and deciding that a fault exists on the transmission line if $S<-S_0$, where $S_0$ is a predetermined positive value, and sending, if a fault is detected on the transmission line, a trip signal to the circuit breaker.

9. The method according to claim 8, further comprises:

comparing the measured voltages $U(t_1)$ and $U(t_2)$ to a positive threshold value $U_0$, and enabling the trip signal to be sent, if the measured voltages are smaller than the threshold value $U_0$.

10. The system according to claim 2, wherein the fault detection unit is further arranged for:

comparing the measured voltages $U(t_1)$ and $U(t_2)$ to a positive threshold value $U_0$, and enabling the trip signal to be sent, only if the measured voltages are smaller than the threshold value $U_0$.

11. The system according to claim 3, wherein the fault detection unit is further arranged for:

comparing the measured voltages $U(t_1)$ and $U(t_2)$ to a positive threshold value $U_0$, and enabling the trip signal to be sent, only if the measured voltages are smaller than the threshold value $U_0$.

12. A high voltage direct current, HVDC, switchyard comprising a fault protection system according to claim 2.

13. A high voltage direct current, HVDC, switchyard comprising a fault protection system according to claim 3.

14. A high voltage direct current, HVDC, switchyard comprising a fault protection system according to claim 4.

15. A high voltage direct current, HVDC, converter station comprising a fault protection system according to claim 2.

16. A high voltage direct current, HVDC, converter station comprising a fault protection system according to claim 3.

17. A high voltage direct current, HVDC, converter station comprising a fault protection system according to claim 4.

18. A high voltage direct current, HVDC, grid comprising a fault protection system according to claim 2.

19. A high voltage direct current, HVDC, grid comprising a fault protection system according to claim 3.

20. A high voltage direct current, HVDC, grid comprising a fault protection system according to claim 4.

* * * * *